United States Patent [19]

Agapiou et al.

[11] Patent Number: 5,236,291
[45] Date of Patent: Aug. 17, 1993

[54] MULTI-TOOTH DRILL WITH IMPROVED CHISEL EDGE

[75] Inventors: John S. Agapiou, Sterling Heights; Thomas E. Berry, Saginaw, both of Mich.

[73] Assignee: General Motors Corporation, Detroit, Mich.

[21] Appl. No.: 937,016

[22] Filed: Aug. 31, 1992

[51] Int. Cl.$^5$ .............................................. B23B 51/02
[52] U.S. Cl. .................................... 408/211; 408/230
[58] Field of Search ............... 51/219 R, 281 SF, 288; 76/5.1, 108.6; 408/211, 230, 715, 227–229, 212–214; 407/54

[56] References Cited

U.S. PATENT DOCUMENTS

| | | | |
|---|---|---|---|
| 2,898,786 | 8/1959 | Willingham | 77/68 |
| 3,055,239 | 9/1962 | Andreasson | 77/65 |
| 4,594,034 | 6/1986 | Maier | 408/230 |
| 4,645,389 | 2/1987 | Maier | 408/230 |
| 5,173,014 | 12/1992 | Agapiou et al. | 408/59 |

OTHER PUBLICATIONS

American Machinist, Whatever Happened to the Chisel Edge?, Feb. 1988, Fred Mason.
An Investigation of the Cutting Mechanisms of the New Point Drill, DeVries, Crosheck Jan. 18, 1988.

Primary Examiner—Steven C. Bishop
Attorney, Agent, or Firm—Patrick M. Griffin

[57] ABSTRACT

A three-flute, three-tooth drill has a central peak on the central axis between three V-shaped teeth that provides improved cutting chisel edges. The rake faces, which produce the V-shaped cutting teeth, are setback of radial planes of the drill, and have a slight positive rake angle. Gashes are ground into the clearance faces in such a way as to produce the peak with three chisel edges, each of which curves radially out and merges into a straight cutting edge with no reversal in slope. Therefore, the chisel edges cut cleanly, due both to their positive axial rake, and due to the fact that there are no undercuts along their length in which chips could build up.

3 Claims, 4 Drawing Sheets

MULTI-TOOTH DRILL WITH IMPROVED CHISEL EDGE

This invention relates to drills in general, and specifically to a drill of the multi-tooth type in which the center, chisel edge of the drill has an improved shape and cutting action.

BACKGROUND OF THE INVENTION

In any center cutting drill, that part of the cutting edge closest to the center axis, called the chisel edge, is one of the most critical portions. Entire trade journal articles have been devoted just to the chisel edge and its shape. Being the most slowly moving part of the drill, the chisel edge produces a chip that is often not so much a discrete chip as it is a smeared, wiped extrusion of metal. Moreover, being located at the most crowded part of the drill, the chips produced by the chisel edges are more likely to pack and build up, and have a less direct exit path into the drill side flutes that take the chips away from the cutting interface and ultimately out of the hole. In a two flute drill, it is relatively easy to provide a chisel edge that operates well. The end of the drill is ground with two main cutting edges, each of which is defined by a plane, known as a rake face, that is ahead of a central, radial plane of the drill. The web of metal left between the two main cutting edges is ground in a four facet design in which a secondary clearance face behind each cutting edge extends past center just far enough to become the rake face of one of a pair of short chisel edges that bridge the web. A less than ideal result of this four facet design is that each chisel edge has a consequently negative axial rake angle. This means that the chisel edge is effectively "dull" and not "sharp" as it sees the workpiece, causing a scraping action, rather than a true cutting action. However, as viewed along the center axis, each chisel edge merges into a respective cutting edge smoothly. The chip that does form on the chisel edge, despite its relative dullness, does move smoothly out and radially along the chisel edge, always moving closer to its respective cutting edge, and without building up on or packing into any concavities or undercuts on the chisel edge. Because the chisel edge chips are plowed smoothly out from the center axis and into the side flute, they can be efficiently removed and flushed out of the hole, reducing drill thrust forces and drill wear. This is especially true for coolant feeding drills.

The great drawback of two flute drills is inherent in their name. There are only two cutting edges and chip exit flutes. More of each would obviously provide more cutting power, and more exit paths for the chips. Moreover, the nature of a two flute drill is such that a greater percentage of the drill body is ground away to create two flutes than would be the case for a three or four flute drill, which reduces its stiffness and resistance to bending. What is not obvious with a multi-flute (meaning more than two) drill design is how to bring more than two chisel edges together at the center axis of the drill and yet still achieve the smooth chisel edge chip removal action that is possible for the two flute drill. One solution for the four flute case is disclosed in U.S. patent application Ser. No. 07/832,513, assigned to the current assignee. There, a two flute drill type of chisel edge serves two of the four cutting edges, while the other two cutting edges are simply not brought all the way in to center. The design there does not lend itself to the three flute case, with its odd number of edges, however. Some other design would be necessary in order to bring three or more chisel edges all together at center.

An even greater challenge is presented when attempting to drill into a workpiece surface that is not perfectly flat. A conventional center cutting drill, with its single center point, will tend to "walk", and will be difficult to hold on axis. In response, so called "toothed" drill designs have been developed. Instead of a single, central point, three or more V-shaped cutting edges create an equal number of points or "teeth" that surround a generally concave center. Especially in the case of the three tooth design, a greater stability is achieved when a curved surface is drilled, since the three teeth contact the surface analogous to a three legged stool. However, there still must be some kind of a chisel edge, a "point within the points," at the very center, in order for there to be complete cutting. When the drill center point is recessed axially from the surrounding teeth, grinding access is far more limited.

One maker of toothed drills is a German company called Hartzmetall, whose patents show a couple of different chisel edge approaches. One design, shown in U.S. Pat. No. 4,594,034, simply avoids the issue by bringing only two of the three edges all the way in to center. Another design brings all the edges together at the center, in both a three and a four flute design, but the way in which the center point ground creates chisel edges that are less than satisfactory. The main V-shaped cutting edges lie directly on, rather than ahead of, a central, radial plane of the drill. A gashing wheel is used to grind gashes near the center of the drill, one for each tooth. The gashing wheel has a flat side and a curved rim, and is sent along a tangent line path through the drill center point, with the flat side of the wheel held on the same radial plane as the cutting edges. The result is that a sharp, pyramid shaped "spur" is left at the center with curved edges that merge into and provide the chisel edges for the V-shaped cutting edges.

There are several drawbacks to this design. The center spur is too sharp, and consequently weak, for many drilling applications. Furthermore, the axial rake angle of the cutting edge shifts from positive to negative at the chisel edge. The patent explicitly recognizes this, describing the cutting action as being transformed, at the point where the positive to negative shift occurs, into a "scraping" action. An attempt is made to portray this as an advantage, with the resulting increased cutting force at the spur being said to help hold the drill on axis. However, realistically speaking, it is the V-shaped teeth that engage the workpiece first, and it is they which will have to provide the initial centering action of the drill. More fundamental is a problem not articulated in the patent, but which would soon show up in use. Since the straight cutting edge lies in a central or radial plane, each chisel edge, after it curves out and away from the center axis, must curve back in order to merge with its respective straight cutting edge, as viewed looking down the center axis. A "cup" or undercut is thereby created, meaning that, as one moves radially out along the chisel edge, it changes slope at some point, relative to the straight cutting edge. The chisel edge chip would not be plowed smoothly and continuously out and along such a chisel edge. Rather, it would tend to build up and "catch" on the chisel edge. An analogy would be the blade of a snow plow having a large dent at some point along its edge. Snow would eventually move from the outer to the inner corner of the blade, but would collect and build up at the dent. It would not be a problem if the blade edge curved continuously along its length, so long as it did not change slope and curve back at some point.

This, then, is the somewhat extensive background of the current invention. There is, despite the plethora of commercially available drills, an apparently unmet need for a multi-tooth, center cutting drill design in which the central, chisel edges are all complete, but all merge smoothly and continuously into their cutting edges. Ideally, the chisel edges would also have an axial rake angle that was everywhere positive and "sharp", while the center peak of the drill would not be so sharp as to be weak.

SUMMARY OF THE INVENTION

The invention meets the need outlined above, providing a drill with the desired characteristics and a method for grinding it. The preferred embodiment disclosed is a three flute, three toothed design. It is ground from an initial preform in which three V-shaped cutting edges are provided by three pairs of oppositely sloped, inner and outer clearance faces that meet at the point of the V, and three rake faces. The rake faces initially lie directly on central, radial planes of the drill. The center point of the drill preform is completely recessed and concave, with no differentiated chisel edge as such. The chisel edges are ground by a specially configured grinding wheel with a curved rim which, in cross section, constitutes a portion of an ellipse with predetermined axes. The elliptical cross section of the rim is tipped relative to the plane of the disk, so the disk is not symmetrical in cross section, but instead has one flat side that is larger in diameter than the other.

The grinding disk is set up to travel up and along a path that will take a rim tangent line through the concave center point of the drill preform, at a predetermined angle to the drill axis. The disk is also oriented so that its larger diameter flat side is offset slightly behind the initial rake face of the drill preform, that is, offset behind a radial plane of the drill, and is also tipped in slightly behind the radial plane. This is done three times, grinding three gashes which slope down from the center of the drill and into the flutes. More specifically, the larger diameter flat side of the wheel cuts a flat side of the gash, also cutting the rake face of the V-shaped teeth back slightly, and thereby creating outer and intermediate straight cutting edges that also lie behind a radial plane. At the same time, the inward tipping of the grinding wheel gives the cutting edges the desired positive axial rake angle. The elliptical cross section rim of the disk cuts a curved side to the gash, while the smaller diameter flat side of the disk does no cutting.

After the gashing process, the straight cutting edges of the V-shaped teeth no longer run directly and straight all the way to the center axis. Each of the three gashes cuts slightly past center and slightly across the adjacent gash and rake face, grinding a curved chisel edge into the innermost part of each intermediate cutting edge, and leaving a short, convex central peak at the center point. The shape of this center peak is complex. As viewed perpendicular to the drill center axis and rake face, each chisel edge curves slightly axially down from the short peak, then back up to merge into an intermediate straight edge. More importantly, as viewed looking down the drill center axis, each chisel edge curves out continuously from the center of the peak and merges into a respective intermediate straight edge, but does not reverse direction or slope. Moreover, its axial rake angle is everywhere positive. In operation, the chisel edges have a true cutting action, not a scraping action. The chisel edge chips do not build up, but are plowed smoothly out and down into the gash and flute. Wear and axial thrust in the drill are both reduced, and drill life improved.

It is, therefore, a general object of the invention to provide a multi-flute, multi-tooth type of center cutting drill with chisel edges that have a true, clean cutting action.

It is another object of the invention to provide such a drill in which each chisel edge merges smoothly into its respective straight cutting edge with no undercuts or reversals in curvature that would cause chip drag or build-up.

It is another object of the invention to provide such a drill in which the axial rake angle of the entire cutting edge, including the chisel edge, is positive.

It is still another object of the invention to provide a method by which a chisel edge with the desired shape and characteristics may be produced.

DESCRIPTION OF THE PREFERRED EMBODIMENT

These and other objects and features of the invention will appear from the following written description, and from the drawings, in which.

Figure 1:
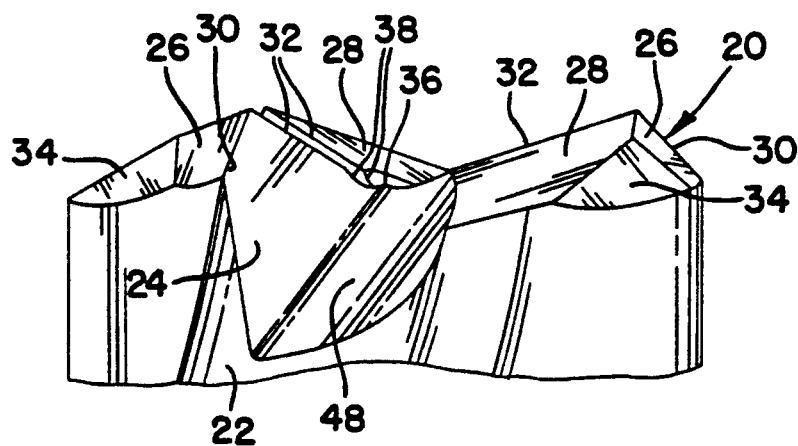
FIG. 1 is a side view of the end of a preferred embodiment of the drill of the invention.
Figure 2:
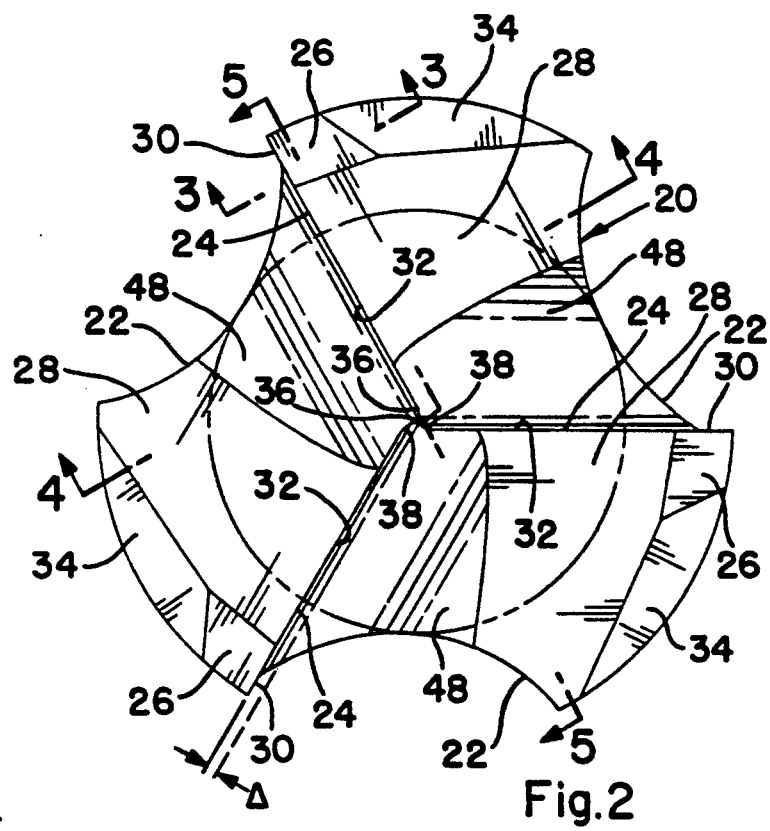
FIG. 2 is an end view of the drill.
Figure 3:
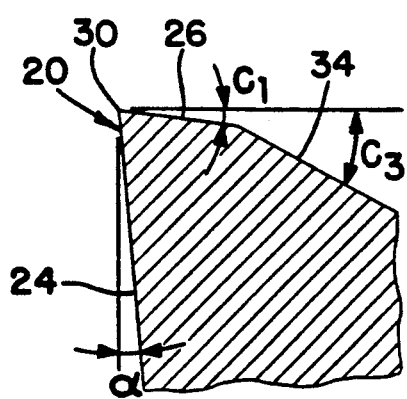
FIG. 3 is a cross section taken along the line 3—3 of FIG. 2.

Referring first to FIGS. 1 and 2, a preferred embodiment of the multi-tooth drill of the invention is indicated generally at (20). Drill (20) is generally cylindrical, but the overall, land-to-land diameter is not critical to the invention. Diameters of less than half an inch to almost an inch have been tried successfully, with the diameter of drill (20) being about 0.40 inches as shown. The design shown has three helical side flutes (22), which have a basically conventional shape. These provide the exit paths for chips formed during the drilling process. No particular dimension is given for their width and depth, but, as noted above, the three or more flute design is inherently stiffer. This is because the web portion diameter, which is the diameter of the inscribed circle shown in FIG. 2 that touches all three flutes (22), is greater as a percentage of the total drill diameter, about 45% here. The comparable percentage in a typical two flute drill would be significantly less.

Referring next to FIGS. 1 through 5, drill (20) has three identical, V-shaped teeth, one respective to each side flute (22), and each of which is comprised of three basic planes or faces ground into drill (20), a generally vertical rake face (24), an outwardly sloped clearance face (26), and an inwardly sloped clearance face (28). Clearance face (26) has a clearance angle $C_1$, measured from horizontal, of 7-9 degrees, and a half point angle $P_1$, measured from vertical, of 45 degrees. Clearance face (28) has a clearance angle $C_2$ of 9-12 degrees, and a half point angle $P_2$ of 110 degrees. The lines of intersection of the three sets of planar faces (24), (26) and (28) produce three pairs of straight cutting edges, an outer cutting edge (30) and intermediate cutting edge (32). The V-shape of the teeth is not symmetrical, however, since the teeth points are located at a radius $R_2$ of 0.130 to 0.170 inches, which makes edge (32) longer than edge (30). The points of the three teeth are not sharp, but are ground off slightly so as to avoid chatter as they initially contact the workpiece. In addition, the outer cutting edges (30) are each backed by a secondary clearance face (34), which has a clearance angle $C_3$ of 27-30 degrees. The axial rake angle of the edges (30) and (32), indicated at $\alpha$, is approximately 5 degrees positive, meaning that each is sharp, and will truly cut, rather than scrape.

Figure 5:
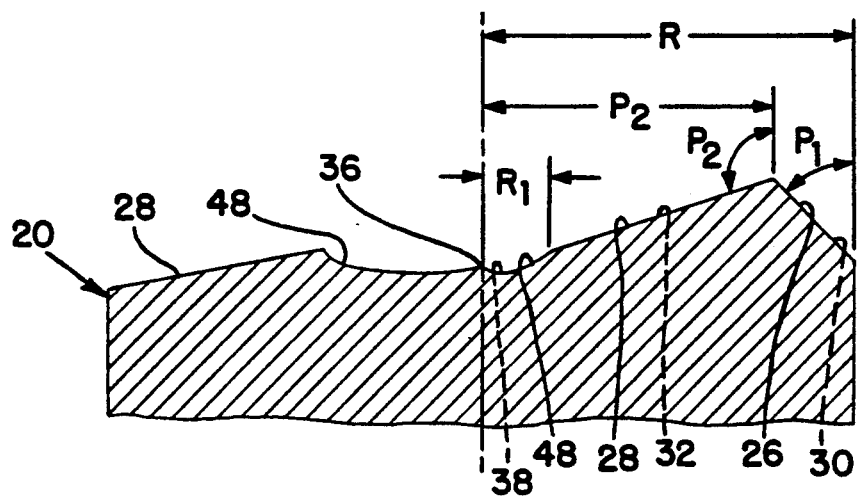
FIG. 5 is a cross section taken along the line 5—5 of FIG. 2.
Figure 6:
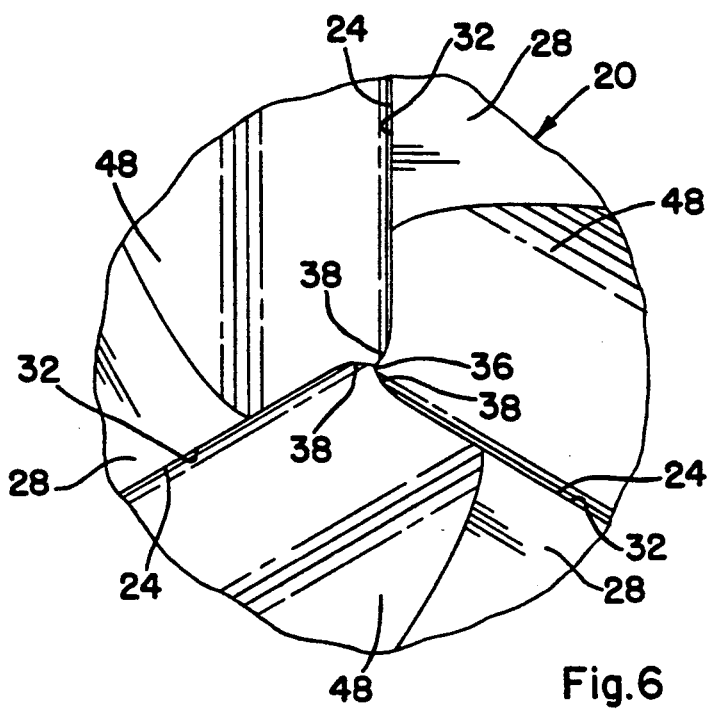
FIG. 6 is an enlargement of the center of FIG. 2.

Referring next to FIGS. 5 and 6, the centermost portion of drill (20) is comprised of a short center peak (36), the point of which is right on the center axis. From the point of peak (36), three chisel edges (38) extend down and out to merge into respective intermediate straight cutting edges (32). There has to be some kind of convex peak or point like (36) at the very center, as well as some kind of chisel edge, in order for cutting to be complete, that is, cutting all the way to center axis. Both the shape of the chisel edges (38) and the method of their grinding, described below, are unique. Each chisel edge (38) is relatively short, intersecting a respective intermediate straight cutting edge (32) at a radius $R_1$ from the center axis of approximately 30 to 40 thousandths of an inch. This $R_1$ distance would be substantially the same for any diameter of drill. As viewed in FIG. 5, from a perspective that is perpendicular both to the center axis of the drill (20) and to rake face (24), each chisel edge (38) curves slightly axially down and then back up. The axial rake angle of the chisel edges (38), though not specifically indicated, is also positive, and substantially equal to the straight cutting edges (30) and (32), meaning that they, too, are "sharp" along their entire length. Just as important to good cutting action, each chisel edge (38), as viewed down the center axis, curves continuously radially out and merges into its respective cutting edge (32) smoothly, by which is meant, with no reverse curvatures or undercuts relative to cutting edge (32). In fact, as viewed down the center axis, the curvature of the the chisel edges (38) is slight enough that they are almost straight, although it would be nearly impossible to grind straight chisel edges in the nearly inaccessible recessed area near the center axis. The unique shape of the chisel edges (38) can be better understood in terms of their method of grinding, described next.

Figure 7:
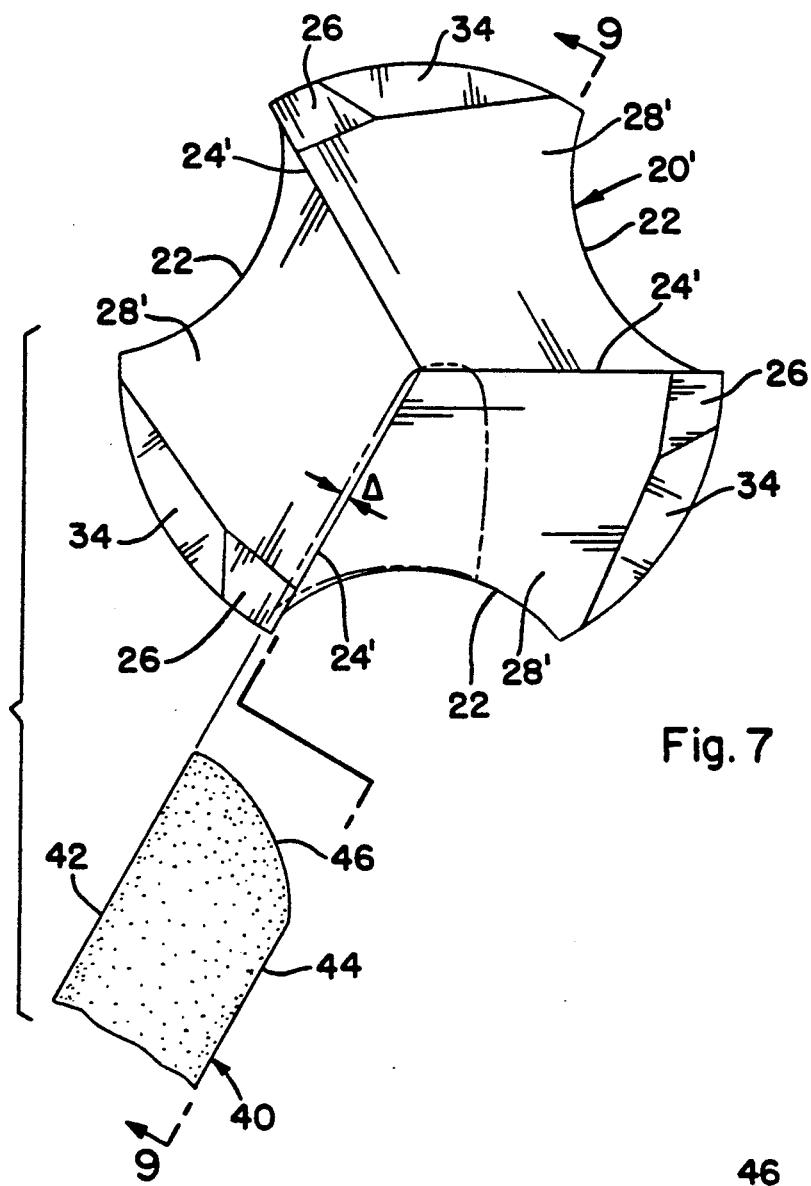
FIG. 7 is an end view of the drill before the gashes are ground, and the edge of a gashing wheel and the path that it follows.
Figure 8:
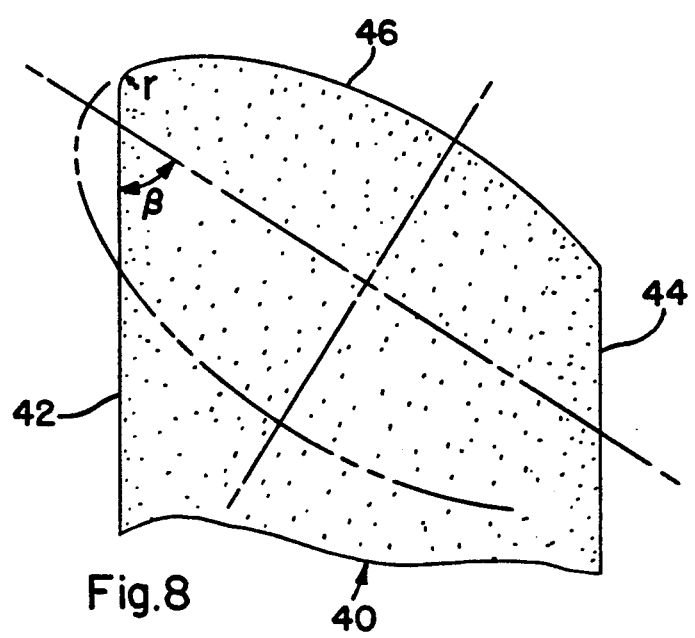
FIG. 8 is an enlargement of the edge of the gashing wheel.
Figure 9:
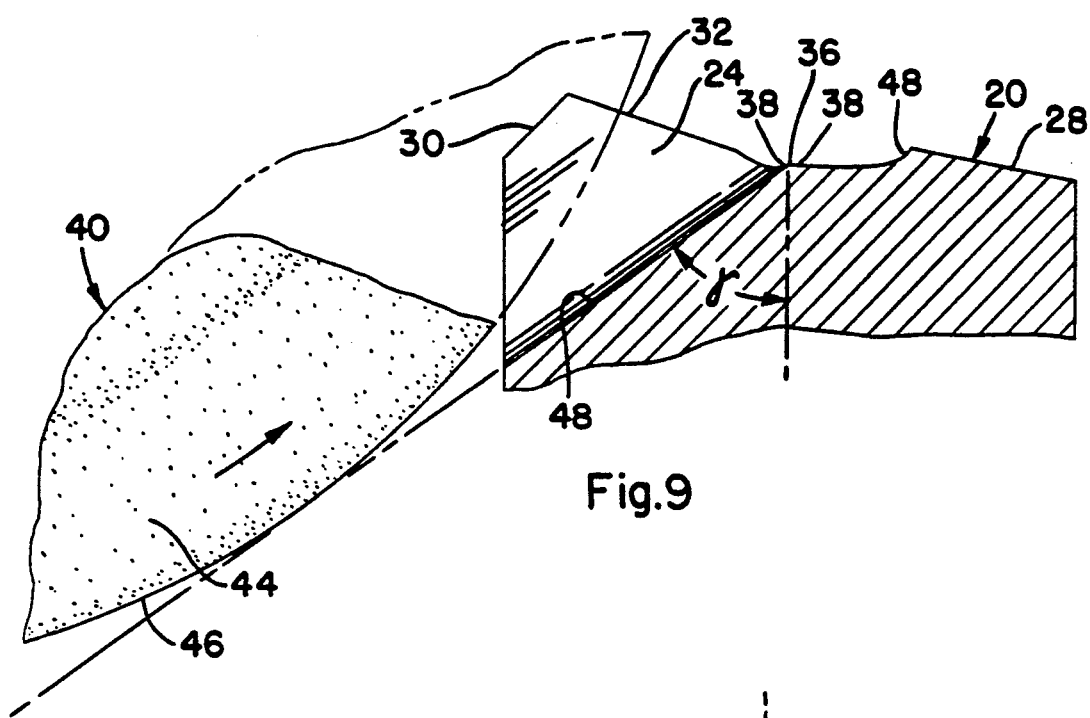
FIG. 9 shows a side view cross section of the drill taken along the line 9—9 of FIG. 7, and shows the path followed by the gashing wheel as it grinds.

Referring next to FIGS. 7 and 8, drill (20) is initially ground as a preform, numbered (20') to indicate its preliminary condition, and the three inwardly sloped clearance faces (28') are continuous and uninterrupted. They meet at a center point which is completely recessed and concave, and therefore incapable of cutting. The preliminary rake faces, indicated at (24'), lie directly on radial planes, with no final rake angle established as yet. Other features, including the flutes (22), outwardly sloped clearance faces (26), and secondary clearance faces (34) are shown as already being ground, because, whenever they are actually ground, they are not affected by the method in which the chisel edges (38) are ground. To create the peak (36), a specially designed gashing wheel, indicated generally at (40), is provided. Wheel (40) has a larger diameter flat side (42), a smaller diameter flat side (44), and is approximately four inches in average diameter and three eighths of an inch thick. The overall diameter of wheel (40) is not critical, but the shape and size of its rim (46) is. Rim (46) has a cross sectional shape, best seen in FIG. 8, that comprises approximately thirty degrees out of an ellipse (shown in dot-dash line) with a major diameter of approximately 0.120 inches and a minor axis of approximately 0.060 inches. The axes of the ellipse are not square to the wheel (40), however. Instead, the major axis forms an angle $\beta$ of about 55 degrees with the larger flat side (42). In addition, the merger of rim (46) with the larger flat side (42) is not sharp, but is given a small radius r of approximately 0.01 to 0.03 inches. Wheel (40) can be used regardless of the total diameter of drill (20), and would itself have to be specially made. This would be done by progressively dressing a flat rimmed wheel with a diamond dresser until its cross section, as projected with an optical comparator, matched the desired profile of rim (46). Those skilled in the art of wheel dressing can do this, once the desired cross sectional shape is known.

Figure 4:
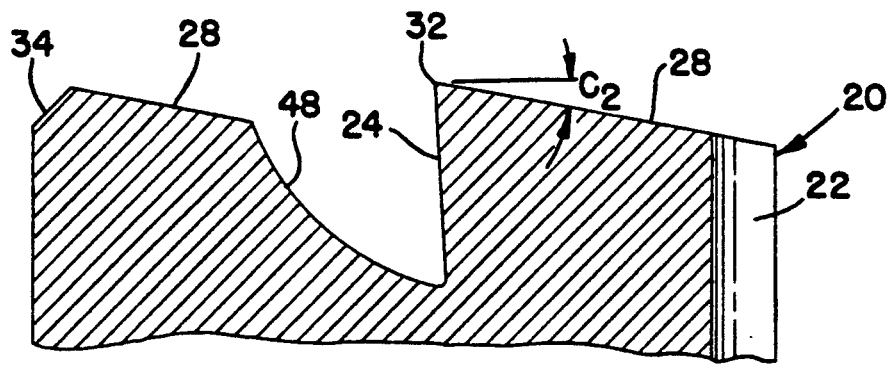
FIG. 4 is a cross section taken along the line 4—4 of FIG. 2.

Referring next to FIGS. 4 through 9, drill preform (20') is ground by holding it firmly in a conventional grinding apparatus, which establishes a precise travel path for wheel (40) relative to drill preform (20'). Specifically, wheel (40) is set up so that a tangent line to the largest diameter surface of its rim (46) will pass right through the center point, the point where the unground clearance faces (28') meet, and at an angle $\gamma$ to the center axis of approximately 45 to 55 degrees. In addition, the larger flat wheel side (42) is held basically parallel to an unground rake face (24'), but tipped toward it at approximately 5 degrees, and also offset behind it by an amount $\Delta$ of approximately 2 to 6 thousandths of an inch. Wheel (40) is driven along the established path until it hits and moves past the end of drill preform (20'), which is then indexed 120 degrees to present the next preliminary rake face (24'), and then again, for three passes in all. The effect of each pass of wheel (40) on the rake face (24') to which it is generally parallel is two-fold. Most of each preliminary rake face (24') is ground back behind a radial plane, as shown by the dotted lines in FIG. 6, establishing the cutting edges (30) and (32) and their axial rake angle. In addition, that portion of the wheel (40) at the slightly radiused merger of flat side (42) and rim (46) grinds the short radial curvature of the chisel edge (38) that appears in the axial view of FIG. 6, which occurs toward the end of the pass, as wheel (40) is leaving drill preform (20'). Furthermore, each pass of wheel (40) also cuts across an adjacent rake face (24' or 24) to locally grind off a small portion of it very near the center axis, creating the axial curvature seen in FIG. 5. A significant portion of the initial clearance face (28') is also ground out, leaving a gash, the shape of which is best seen in FIG. 4, and which is comprised of the ground rake face (24), and a curved surface (48) ground by the rim (46). The larger diameter flat side (44) does not do any grinding. The gash provides a more direct chip exit path from the center axis area out to the side flutes (22). The three passes of the gashing wheel (40) wheel have a symmetrical, mutual overlap, the net result of which, given the setback δ, is to create the peak (36) and chisel edges (38) described above. Each chisel edge (38) retains the axial rake angle of the rake face (24).

Figure 10:
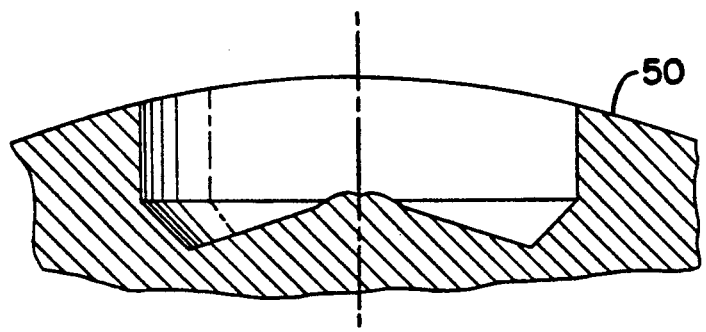
FIG. 10 shows a cross section of the cut interface at the bottom of a workpiece hole produced by the drill.
Figure 11:
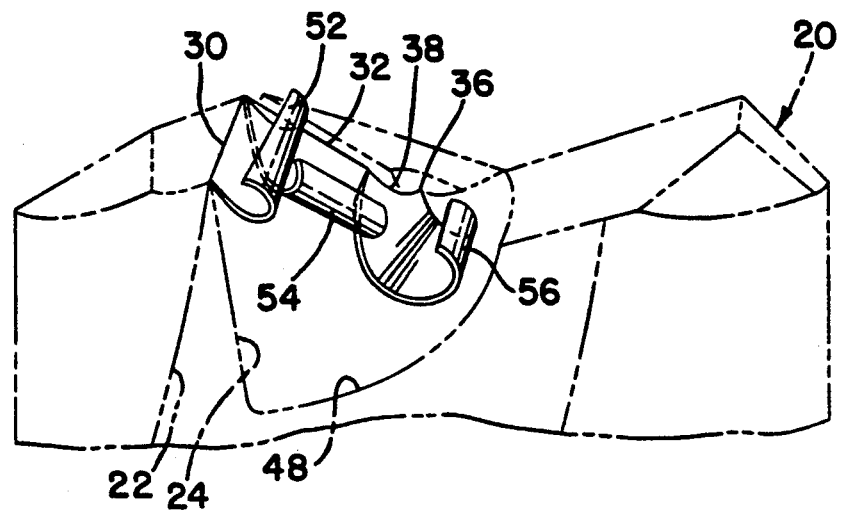
FIG. 11 is a schematic representation of the chips formed by the various cutting edges.

Referring next to FIGS. 10 and 11, the operation of completed drill (20) is described. Drill (20) is rotated and driven axially into a workpiece (50) as any drill would be. Unlike a conventional drill, it is the intersection "points" of the pairs of straight cutting edges (30) and (32) that contact the surface of workpiece (50) first, not the recessed peak (36). As noted, this gives increased stability on curved surfaces. Outer and inner chips (52) and (54) form on the edges (30) and (32) respectively, sliding down the rake faces (24) toward one another and ultimately into the gashes and down into the flutes (22). Any collision between the chips (52) and (54) is beneficial, as it helps to break them up. Eventually, drill (20) moves axially far enough into workpiece (50) that the center peak (36) contacts it, creating the complex shaped cutting interface shown in FIG. 10. Since peak (36) is very short and its curvature is not sharp, it is not weak or subject to breakage. Despite its smallness, peak (36) is effective, and needed, since its chisel edges (38) do the cutting near the axis of drill (20) that must occur if drill (20) is to drill a complete hole. Specifically, a chisel edge chip (56) forms along each chisel edge (38), which has a true cutting action, given its positive, "sharp" axial rake. Moreover, the chisel edge chip (56) is plowed radially out and along the chisel edge (38) smoothly, as it moves down the rake face (24), without packing into or hanging up in any pockets or reverse curvatures along chisel edge (38). Because the rake face (24) is less deep near the center axis, the chisel edge chip (56) can easily hit bottom and curl up the curved gash surface (48), which is beneficial in breaking it up. This, combined with the good cutting action of the sharp chisel edge (38), and its smooth, nonreversing curvature, helps to quickly expel the chisel edge chips (56) out and into the side flutes (22). In terms of chisel edge chip disposal, then, drill (20) appears to operate just as well as a conventional two flute center cutting drill, and, in terms of chisel edge chip formation, even better, since it has a positive, sharp axial rake angle. Axial thrust force and drill wear are thereby substantially improved due to the optimized performance of this most critical drill component, the chisel edge (38).

Variations in the disclosed embodiment could be made, some of which have already been touched upon. A four flute drill could be made by the same gashing process, but with four passes. Different diameter drills could be made with the same size wheel, as noted. Some variation in the size of the setback or offset Δ could be made, so long as it was still there, that is, so long as the initial rake face (24′) is cut back behind the radial plane. So long as the offset is there, the merger between the flat wheel side (42) and the curved rim (46) will create the peak (36) and chisel edges (38) with the desired shape. Therefore, it will be understood that it is not intended to limit the invention to just the embodiment disclosed.

The embodiments of the invention in which an exclusive property or privilege is claimed are defined as follows:

1. A multi-flute, multi-tooth center cutting drill having a central axis, comprising, a plurality of pairs of straight cutting edges including a plurality of substantially identical straight cutting edges, including an inwardly sloped intermediate cutting edge and an outwardly sloped outer cutting edge formed by a planar rake face, said rake face being offset slightly behind a plane through said central axis, and, a peak centered on said central axis including a plurality of chisel edges, each of which, as viewed along said central axis, curves radially out from said central axis and merges smoothly into a respective intermediate cutting edge with no reversal in slope relative to said intermediate cutting edge.

2. A multi-flute, multi-tooth center cutting drill having a central axis, comprising, a plurality of pairs of straight cutting edges, including a plurality of substantially identical straight cutting edges, including an inwardly sloped intermediate cutting edge and an outwardly sloped outer cutting edge formed by a planar rake face, said rake face further having a slight positive axial rake angle and being offset slightly behind a plane through said central axis, and, a peak centered on said central axis including a plurality of chisel edges, each of which, as viewed along said central axis, curves radially out from said central axis and merges smoothly into a respective intermediate cutting edge with no reversal in slope relative to said intermediate cutting edge.

3. A three-flute, three-tooth center-cutting drill having a central axis, comprising, three pairs of straight cutting edges, including a plurality of substantially identical straight cutting edges, including an inwardly sloped intermediate cutting edge and an outwardly sloped outer cutting edge formed by a planar rake face, said rake face further having a slight positive axial rake angle and being offset slightly behind a plane through said central axis, and, a peak centered on said central axis including three chisel edges, each of which, as viewed along said central axis, curves radially out from said central axis and merges smoothly into a respective intermediate cutting edge with no reversal in slope relative to said intermediate cutting edge.

* * * * *